United States Patent [19]

Borzachillo

[11] 4,146,200
[45] Mar. 27, 1979

[54] AUXILIARY FLAPERON CONTROL FOR AIRCRAFT

[75] Inventor: Angelo Borzachillo, Torrance, Calif.

[73] Assignee: Northrop Corporation, Los Angeles, Calif.

[21] Appl. No.: 833,307

[22] Filed: Sep. 14, 1977

[51] Int. Cl.$^2$ ........................... B64C 9/06; B64C 9/12
[52] U.S. Cl. ................................. 244/75 R; 244/90 R; 244/215
[58] Field of Search .................... 244/213, 215, 90 R, 244/83 C, 34 R, 35 R, 13, 15, 75 R, 216, 217, 90 A, 201

[56] References Cited

U.S. PATENT DOCUMENTS

| 2,174,542 | 10/1939 | Weick | 244/90 R |
| 2,279,615 | 4/1942 | Bugatti | 244/217 |
| 2,522,159 | 9/1950 | Billington | 244/225 |
| 2,750,132 | 6/1956 | Palmer et al. | 244/90 R |
| 3,659,810 | 2/1972 | Robertson | 244/215 |

FOREIGN PATENT DOCUMENTS

| 677527 | 6/1939 | Fed. Rep. of Germany | 244/213 |
| 2156486 | 3/1973 | Fed. Rep. of Germany | 244/215 |

OTHER PUBLICATIONS

"Northrop YF-17", *Jane's All The Worlds Aircraft*, 1974-1975, pp. 409-410.

*Primary Examiner*—Galen L. Barefoot
*Attorney, Agent, or Firm*—Willard M. Graham; William W. Rundle

[57] ABSTRACT

An auxiliary flaperon control is pivotally mounted on the trailing edge of each wing of an aircraft between the outboard control surfaces and the fuselage and in close proximity to the tail of said aircraft; the auxiliary flaperon controls being operable relative to the outboard control surfaces to induce supplementary aerodynamic forces on the aircraft tail to thereby augment the effectiveness of aircraft lateral and directional control.

8 Claims, 3 Drawing Figures

SECTION A-A

AUXILIARY FLAPERON CONTROL FOR AIRCRAFT

BACKGROUND OF THE INVENTION

The present invention relates to aircraft flight controls for lateral control and roll rate control of an aircraft, and more particularly to auxiliary flight control surfaces, or so-called flaperons, for aircraft.

An aerodynamic problem that has long plagued aviation concerns lateral control of aircraft during certain conditions of flight. In the lateral control of an aircraft during turn and roll maneuvers, for example, conventional ailerons or flaperons are employed, and generally are adequate for conventional aircraft employing relatively thick wings. However, the effectiveness of ailerons or flaperons on aircraft having relatively thin wings is severely reduced or impaired during transonic maneuvers. Moreover, it is well known that supersonic aircraft can suffer control reversal at transonic speeds, which can have an adverse effect on lateral control and rate of roll of the aircraft.

The use of conventional ailerons or flaperons on thin wing combat aircraft, furthermore, requires additional structural weight in the wings to obtain the rigidity necessary to achieve the required roll rate or time to bank angle.

A number of devices have been proposed to overcome the problem discussed above, some of which have been, and now are employed on aircraft; such as multiple and single spoilers, spoiler and aileron/flap combinations, etc., all of which impose penalties of a one kind or another on the overall efficiency of the wings during normal flight since it is not practicable to maintain aerodynamic smoothness or surface continuity on the wing surfaces with such devices, for normal flight.

In addition, such devices tend to be unduly complex, expensive, and frequently substantially reduce the structural strength of the wings. Also, the more complex devices are subject to malfunction or possible failure.

Contemporary military aircraft designed for sustained supersonic flight require wings with ultra-thin sections that obviously limit the options available in the use of prior known auxiliary aircraft control devices.

PRIOR ART STATEMENT

The following patents are cited herein as the most pertinent prior art of which the applicant is aware:

| U.S. Pat. No. | Name | Date |
| --- | --- | --- |
| 2,174,542 | Weick | Oct. 3, 1939 |
| 2,522,159 | Billington | Sept. 12, 1950 |
| 2,750,132 | Palmer et al | June 12, 1956 |
| 3,659,810 | Robertson | Feb. 5, 1972 |

While it is possible that more pertinent prior art exists, the Applicant's search is believed to have been conducted with conscientious effort to locate and evaluate the most pertinent prior art available at the time, but is not to be construed as a representation that no better art exists.

The auxiliary control means disclosed in the prior patents listed above are indicative of the wide variety of expedients devised to augment the effectiveness of conventional control surfaces during transonic maneuvers.

U.S. Pat. No. 2,174,542 (Weick) discloses a pair of retractible ailerons buried in the upper surface of the wings a short distance forwardly of the wing trailing edges and differentially operable in conjunction with a full span split flap. Operation of the combination of the retractible ailerons and split flaps provides a downwardly deflectable wind break or lift increasing device along the trailing edges of the wings.

The control system for combined operation of ailerons and flaps, thus suggesting a so-called flaperon control system, is disclosed in U.S. Pat. No. 2,522,159 and simply teaches interconnecting the controls of the ailerons with the flaps for operation as a single pair of movable surfaces that can function either as flaps or as ailerons.

U.S. Pat. No. 2,750,132 (Palmer et al) discloses an aileron and spoiler combination which purports to improve lateral control, and rate of roll, for high speed aircraft, the spoiler being used to decrease wing lift in connection with the use of up aileron to force the wing down and thereby supplement aileron action under conditions where maximum rate of roll is desired, without requiring additional aileron booster forces.

U.S. Pat. No. 3,659,810 (Robertson) discloses a specially shaped wing incorporating so-called flaperons and flaps, in which the droop setting of the flaperons is coordinated with the deflection of the flaps so as to produce nearly maximum lift without excessive drag during takeoff of the aircraft. A modification of the wing leading edges is described for use where the wing profiles are relatively thin.

It is an object of the present invention to provide auxiliary control surfaces for an aircraft to augment the lateral or roll control and directional or yaw control of the aircraft in flight.

It is a further object of my invention to provide auxiliary flaperon controls which are readily adaptable to relatively thin aircraft wings.

It is a still further object of my present invention to provide auxiliary flaperon controls for high speed aircraft, which controls may relatively easily be adapted to existing aircraft at a relatively low cost, and which are relatively simple and substantially free of malfunctions or failure.

It is yet another object of my invention to provide a versatile auxiliary flaperon control for aircraft that is suitable for use as take-off and landing flaps, speed brakes, and for gust or load alleviation during flight.

SUMMARY OF THE INVENTION

According to my invention, auxiliary flaperon control members in the form of hinged plates or airfoils are mounted between the ailerons and fuselage of an aircraft, forwardly of, and in relatively close proximity to, the aircraft tail. The auxiliary flaperon control members are differentially actuated relative to the main flaperons to induce supplementary aerodynamic forces on the tail to augment the effectiveness of lateral and directional control during combat maneuvers. The additional control effectiveness is made possible with the auxiliary flaperon control of my invention, with minimum wing weight, and at minimum cost.

DESCRIPTION OF THE PREFERRED EMBODIMENT

Figure 1:
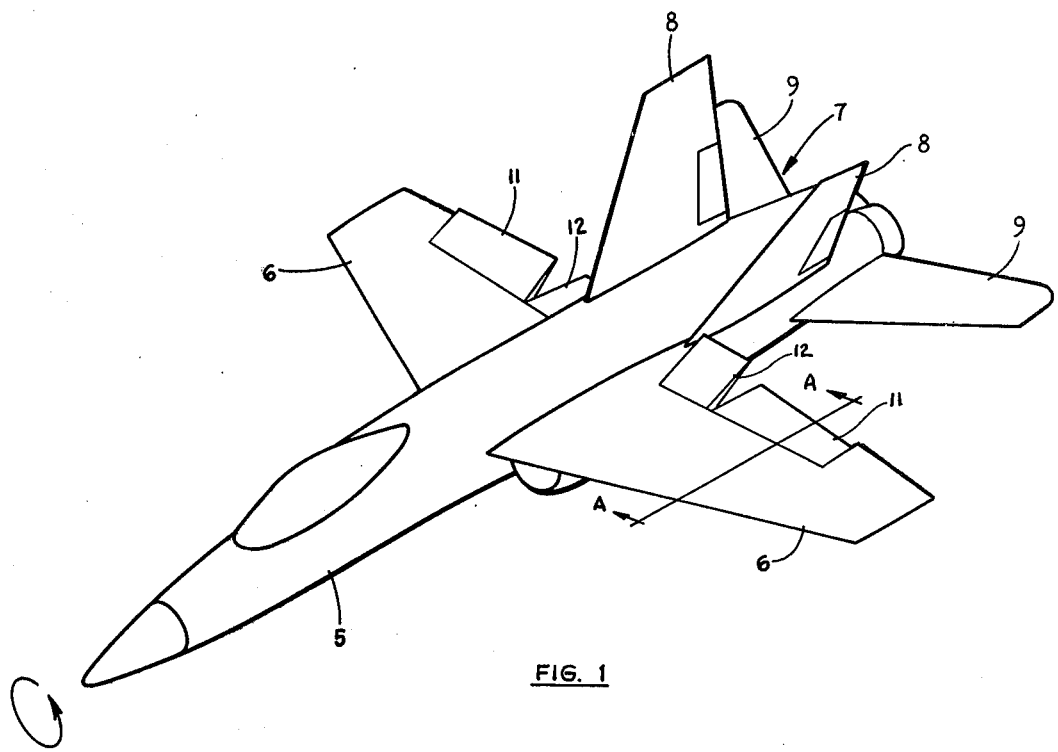
FIG. 1 is a perspective view of an aircraft.
Figure 2:
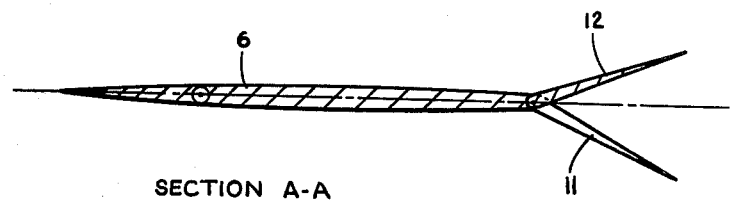
FIG. 2 is a cross-sectional elevational view taken on line A-A of FIG. 1.

In FIG. 1, an aircraft is shown, and includes a fuselage 5, swept thin wings 6, and tail 7 which, in the present example includes a pair of canted vertical stabilizers or fins 8, and conventional horizontal stabilizers 9. The wing 6, includes conventional main flaperons 11 mounted on the trailing edge section of each wing 6. Flaperons 11 operating together can be used as a conventional flap for take-off and landing, or can operate differentially as shown in FIG. 2, i.e., in opposition to each other, to cause the aircraft to roll.

Aircraft of generally conventional design obtain directional stability primarily from a vertical stabilizer or fin mounted on the aft end of the fuselage, which vertical fin produces an aerodynamic restoring force to return the aircraft to a straight course whenever the aircraft tends to yaw due to cross winds encountered in flight, and during takeoffs and landings.

Since the location of vertical fins places them in the wakes, i.e., the regions of disturbed flow which form behind the wings 6 and fuselage 5 during flight, the effectiveness of the fins to perform their function is severely reduced or impaired, particularly at the higher angles of attack wherein these regions of disturbance grow relatively large. Thus, twin canted vertical fins are commonly employed in combat aircraft to increase the directional stability at high angles of attack.

To impress an additional increment of directional control on the aircraft at high angles of attack, and thereby effectively augment lateral or roll control, auxiliary control surfaces or flaperons 12, in accordance with my invention, are mounted between the main flaperons 11 and fuselage 5 on each wing 6. The auxiliary flaperons 12 preferably are in the form of streamlined plates or conventional airfoils fabricated of a high strength lighweight material such as graphite or boron composite, if desired, to avoid excessive weight on thin wings.

Alternatively, the outboard surface controls or main flaperons 11 can be divided into two separately operable sections, the inboard section defining the auxiliary flaperon control 12 and the outboard section defining the main flaperon 11, as in the present example.

The auxiliary flaperons 12 are hinged to the trailing edges of the wings 6 by conventional mechanical means to move upwardly and downwardly in the same manner as the main flaperon 11, but differentially with respect thereto during a roll maneuver, i.e., when the main flaperon 11 on one side of the aircraft is moved downwardly to impress a rolling motion on the aircraft, the auxiliary flaperon 12 on the same side is moved upwardly as shown in FIG. 2, and vice versa.

Because of the close proximity of the auxiliary flaperon 12 to the tail 7, the induced aerodynamic forces exerted by the air flow trailing over the auxiliary flaperon 12 will impress an additional aerodynamic moment against the tail 7 and thereby augment the aileron to roll the aircraft.

The auxiliary flaperons 12 can be powered by any conventional hydraulic or mechanical power system (not shown), similar to that employed to operate the ailerons and flaps. However, the auxiliary flaperons 12 can be separately controlled by the pilot for movement together downwardly, i.e., drooped, as flaps. to augment the main flaperons during takeoffs and landing, and also as speed brakes.

Figure 3:
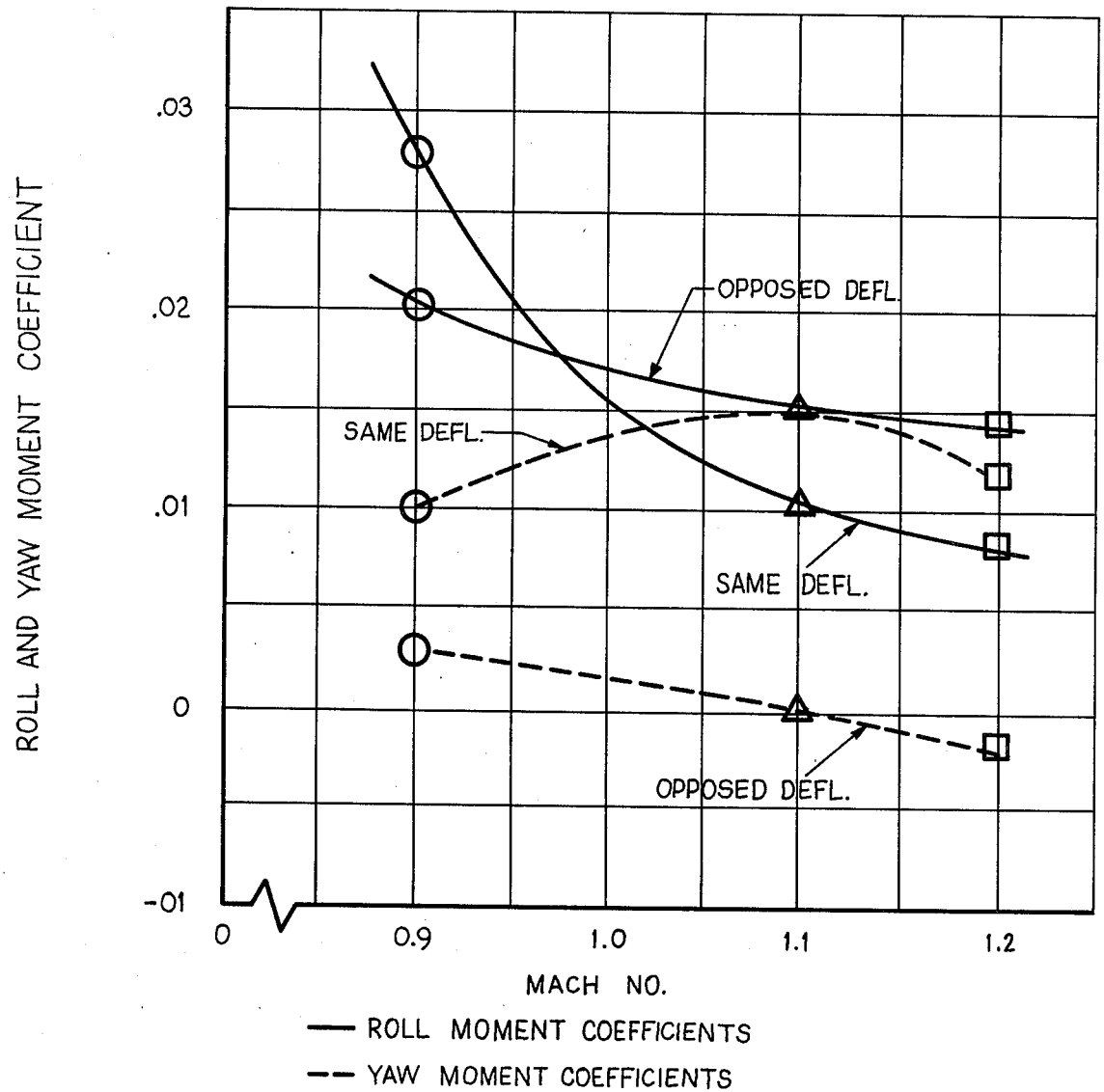
FIG. 3 is a graph showing the increased roll and yaw moments achieved with the auxiliary flaperon control of the present invention.

The auxiliary flaperon control of my invention was tested in the Northrop Supersonic wind tunnel with excellent results. The graph of FIG. 3 shows a comparison of roll and yaw moments plotted against Mach. No. utilizing two auxiliary control surfaces deflected oppositely and then deflected together as a conventional flaperon. The test results thus demonstrate that an opposed deflected auxiliary flaperon control can increase the roll moment by 40 percent at Mach=1.1, and 75 percent at Mach 1.2. Subsonic speeds as indicated in the graphs shows a decrease in roll moment when deflected oppositely.

To achieve maximum effectiveness from the auxiliary flaperon at all Mach numbers, any available conventional programed control system (not shown), selecting the correct deflections of each surface, that is opposed or together, can be incorporated into the aircraft control system. I do not deem such a control system as a part of my invention.

It will be appreciated by those skilled in the art that the auxiliary flaperon control of my invention can be beneficially employed on aircraft having wings of conventional thickness, as well as on aircraft employing conventional separate ailerons and flaps where the auxiliary flaperon control of my invention is mounted inboard, as described above, between the outboard aileron and flap control surfaces and the fuselage, and in close proximity to the tail.

It will be further understood that the auxiliary flaperon control described herein will provide a beneficial additional increment of aerodynamic force on any aircraft employing a single vertical fin or a V-tail, on aircraft employing a vertical fin or fins without horizontal stabilizers, or on aircraft employing a tall vertical fin with horizontal stabilizers mounted at the upper end of the fin.

Clearly, other variations and modifications within the spirit of my invention may occur to those skilled in the art. It is therefore to be understood that, within the scope of the appended claims, my invention may be practiced otherwise than specifically described above with respect to the preferred embodiment.

I claim:

1. In an aircraft which includes a fuselage, relatively thin right and left wings, outboard control surfaces mounted on the trailing edges of said wings, and a vertical tail:

a. auxiliary control means pivotally mounted on each of said wings intermediate said outboard control surface and said fuselage forwardly of said vertical tail in close proximity thereto, said auxiliary control means being independently operable in opposition to movement of said outboard control surfaces to induce a supplementary aerodynamic forces on said vertical tail and thereby augment the roll rate and directional control on said aircraft.

2. The invention according to claim 1 wherein said auxiliary control means are also capable of being operated in unison with said outboard control surfaces as flaps during takeoff and landing of said aircraft, as speed brakes, and load alleviation.

3. The invention according to claim 1 wherein said auxiliary control means are defined by plates mounted to pivot on hinges on the trailing edges of said wings.

4. The invention according to claim 1 wherein said auxiliary control means are conventional airfoils.

5. The invention according to claim 1 wherein said auxiliary control means are defined by separate and independently operable inboard segments of said outboard control surfaces.

6. The invention according to claim 1 wherein said outboard control surfaces are conventional flaperons.

7. In an aircraft which includes a fuselage, relatively thin right and left wings, main flaperons mounted outboard on each of said wings on the trailing edges thereof, and a vertical tail:
   a. an auxiliary flaperon control member mounted on the trailing edge of each of said wings intermediate said main flaperon and said fuselage forwardly of and in close proximity to said vertical tail, each of said auxiliary flaperon control members being independently operable in opposition to the movement of the main flaperon adjacent thereto to induce an additional aerodynamic force against said vertical tail and thereby increase the roll moment of said aircraft during transonic flight maneuvers, said auxiliary flaperon control members also being capable of operation in unison with said main flaperons as flaps during takeoffs, landings, as speed brakes, and for load alleviation.

8. The invention according to claim 7 wherein said roll moment is increased by a factor in the order of 40 percent at Mach 1.1.

* * * * *